United States Patent
Yoshioka et al.

(10) Patent No.: US 11,390,716 B2
(45) Date of Patent: Jul. 19, 2022

(54) FIBER-REINFORCED MOLDING MATERIAL AND MOLDED ARTICLE USING SAME

(71) Applicant: DIC Corporation, Tokyo (JP)

(72) Inventors: Chikara Yoshioka, Osaka (JP); Yukiko Fujita, Osaka (JP)

(73) Assignee: DIC CORPORATION, Tokyo (JP)

( * ) Notice: Subject to any disclaimer, the term of this patent is extended or adjusted under 35 U.S.C. 154(b) by 46 days.

(21) Appl. No.: 16/765,464

(22) PCT Filed: Oct. 30, 2018

(86) PCT No.: PCT/JP2018/040259
§ 371 (c)(1),
(2) Date: May 19, 2020

(87) PCT Pub. No.: WO2019/098007
PCT Pub. Date: May 23, 2019

(65) Prior Publication Data
US 2020/0277454 A1    Sep. 3, 2020

(30) Foreign Application Priority Data
Nov. 20, 2017   (JP) .............................. JP2017-222671

(51) Int. Cl.
C08J 5/04        (2006.01)
C08F 20/18       (2006.01)
C08F 20/30       (2006.01)
C08L 63/10       (2006.01)
C08K 5/21        (2006.01)

(52) U.S. Cl.
CPC .............. *C08J 5/042* (2013.01); *C08F 20/18* (2013.01); *C08F 20/30* (2013.01); *C08L 63/10* (2013.01); *C08J 2363/10* (2013.01); *C08K 5/21* (2013.01)

(58) Field of Classification Search
CPC ......... Y10T 428/2991; Y10T 428/2998; Y10T 442/2279; B32B 2255/00; B32B 2255/26; B32B 2270/00; B32B 23/08; B32B 27/08; B29B 7/007; B29B 7/90; B29C 43/00; B29C 70/06; B29C 70/42; C08F 20/18; C08F 20/30; C08J 2363/02; C08J 2363/10; C08J 5/042; C08J 5/24; C08J 5/243; C08J 5/04; C08L 63/10; C08K 5/21

USPC ............... 428/299.1, 403, 407; 427/220, 221
See application file for complete search history.

(56) References Cited

U.S. PATENT DOCUMENTS 5,342,554 A    8/1994   McBain et al.

FOREIGN PATENT DOCUMENTS

| EP | 3438167 A1 | | 2/2019 |
| JP | 2005-247879 A | | 9/2005 |
| JP | 2005247879 A | | 9/2005 |
| JP | 2006-045404 A | | 2/2006 |
| JP | 2O06152104 | * | 6/2006 |
| JP | 2009-013306 A | | 1/2009 |
| WO | 2015/133289 A1 | | 9/2015 |
| WO | 2017/043325 A1 | | 3/2017 |
| WO | WO2017-043325 | * | 3/2017 |
| WO | 2017/110446 A1 | | 6/2017 |
| WO | 2018/070076 A1 | | 4/2018 |

OTHER PUBLICATIONS

Chemical Book, 2-phenoxyethyl methacrylate, accessed online Aug. 30, 2021.*
International Search Report issued in corresponding International Patent Application No. PCT/JP2018/040259, dated Jan. 29, 2019, with English translation.
European Extended Search Report issued in corresponding European Patent Application No. 18879026.5, dated Jul. 13, 2021.

* cited by examiner

*Primary Examiner* — Camie S Thompson
(74) *Attorney, Agent, or Firm* — McDermott Will & Emery LLP

(57) ABSTRACT

A fiber-reinforced molding material includes: as essential raw materials, a vinyl ester (A) which is a reaction product of an epoxy resin (a1) having an epoxy equivalent in the range of 180 to 500 and a (meth)acrylic acid (a2); an unsaturated monomer (B) having a flash point of 100° C. or higher; a thermoplastic resin (C); a polyisocyanate (D); a polymerization initiator (E); and carbon fibers (F) having a fiber length of 2.5 to 50 mm. The mass ratio ((A)/(B)) of the vinyl ester (A) to the unsaturated monomer (B) is in the range of 40/60 to 85/15. The molar ratio (NCO/OH) of the isocyanate group (NCO) of the polyisocyanate (D) to the hydroxy group (OH) of the vinyl ester (A) is in the range of 0.25 to 0.85.

11 Claims, No Drawings

FIBER-REINFORCED MOLDING MATERIAL AND MOLDED ARTICLE USING SAME

CROSS REFERENCE TO RELATED APPLICATIONS

This patent application is the U.S. National Phase under 35 U.S.C. § 371 of International Application No. PCT/JP2018/040259, filed on Oct. 30, 2018, which claims the benefit of Japanese Patent Application No. 2017-222671, filed on Nov. 20, 2017, the entire contents of each are hereby incorporated by reference in their entirety.

TECHNICAL FIELD

The present invention relates to a fiber-reinforced molding material from which a molded article excellent in various physical properties can be obtained, and a molded article thereof.

BACKGROUND ART

A fiber-reinforced resin composite material obtained by reinforcing a thermosetting resin such as an epoxy resin or an unsaturated polyester resin using carbon fibers as reinforcing fibers has attracted attention because of its characteristics of excellent heat resistance and mechanical strength while being lightweight, and has been increasingly used for various structural applications such as casings of automobiles and airplanes or various members. As a method for molding a material using an epoxy resin in the fiber-reinforced resin composite material, an autoclave method in which a material called prepreg is heated and cured in a pressurizable autoclave is known, and as a method for molding a material using an unsaturated polyester resin, a method in which an intermediate material called sheet molding compound (SMC) or bulk molding compound (BMC) is cured and molded by a method such as press molding or injection molding is known. In particular, in recent years, materials having excellent productivity have been actively developed.

As such a molding material, for example, a carbon fiber-reinforced sheet-shaped molding material containing an unsaturated polyester, a vinyl monomer, a thermoplastic polymer, a polyisocyanate, a filler, conductive carbon black, and a wide carbon fiber bundle as essential components is known (for example, see PTL 1). Although a molded article excellent in appearance can be obtained from this molding material, since a styrene monomer having high volatility is used, the odor is strong, and there is a problem in the working environment during the molding operation.

CITATION LIST

Patent Literature

PTL 1: JP-A-2009-13306

SUMMARY OF INVENTION

Technical Problem

An object of the present invention is to provide a fiber-reinforced molding material excellent in a working environment during the molding operation and capable of obtaining a molded article excellent in various physical properties such as dimensional accuracy, and to provide the molded article.

Solution to Problem

The present inventors have found that a fiber-reinforced molding material including, as essential components, a specific vinyl ester, an unsaturated monomer having a flash-point of 100° C. or higher, a polymerization initiator, a thermoplastic resin, a polyisocyanate, and carbon fibers having a fiber length of 2.5 to 50 mm is excellent in handling property and molding property, and a molded article excellent in various physical properties such as dimensional accuracy can be obtained, and have completed the present invention.

That is, the present invention provides a fiber-reinforced molding material including: as essential raw materials, a vinyl ester (A) which is a reaction product of an epoxy resin (a1) having an epoxy equivalent of 180 to 500 and a (meth)acrylic acid (a2); an unsaturated monomer (B) having a flash point of 100° C. or higher; a thermoplastic resin (C); a polyisocyanate (D); a polymerization initiator (E); and carbon fibers (F) having a fiber length of 2.5 to 50 mm, wherein the mass ratio ((A)/(B)) of the vinyl ester (A) to the unsaturated monomer (B) is in the range of 40/60 to 85/15, and the molar ratio (NCO/OH) of the isocyanate group (NCO) of the polyisocyanate (D) to the hydroxy group (OH) of the vinyl ester (A) is in the range of 0.25 to 0.85, and a molded articled using the fiber-reinforced molding material.

Advantageous Effects of Invention

Molded articles obtained from the fiber-reinforced molding material of the present invention are excellent in dimensional moldability and the like, and thus are suitable for use in automotive members, railroad vehicle members, airspace craft members, ship members, house facility members, sports members, light-weight vehicle members, construction and civil engineering members, case bodies for OA instrument, and the like.

DESCRIPTION OF EMBODIMENTS

A fiber-reinforced molding material of the present invention includes, as essential raw materials, a vinyl ester (A) which is a reaction product of an epoxy resin (a1) having an epoxy equivalent in the range of 180 to 500 and a (meth)acrylic acid (a2); an unsaturated monomer (B) having a flash point of 100° C. or higher; a thermoplastic resin (C); a polyisocyanate (D); a polymerization initiator (E); and carbon fibers (F) having a fiber length of 2.5 to 50 mm, wherein the molar ratio (COOH/EP) of the epoxy group (EP) of the epoxy resin (a1) to the carboxyl group (COOH) of the (meth)acrylic acid (a2) is in the range of 0.6 to 1.1, the mass ratio ((A)/(B)) of the vinyl ester (A) to the unsaturated monomer (B) is in the range of 40/60 to 85/15, and the molar ratio (NCO/OH) of the isocyanate group (NCO) of the polyisocyanate (D) to the hydroxy group (OH) of the vinyl ester (A) is in the range of 0.25 to 0.85.

In the present invention, "(meth)acrylic acid" refers to one or both of acrylic acid and methacrylic acid.

The vinyl ester (A) is obtained by reacting the epoxy resin (a1) having an epoxy equivalent in the range of 180 to 500 with the (meth)acrylic acid (a2). Since the vinyl ester (A) contains a molecular chain having 2 or more hydroxy groups per molecular chain, the reaction is preferably carried out at a molar ratio (COOH/EP) in the range of 0.6 to 1.1 because the fiber-reinforced molding material of the present invention reacted with an aromatic isocyanate is excellent in the balance between handling property such as film peelability and tackiness during molding and fluidity. From this viewpoint, the epoxy equivalent of the epoxy resin (a1) is more preferably in the range of 200 to 400.

Examples of the epoxy resin (a1) include bisphenol type epoxy resins such as bisphenol A type epoxy resins, bisphenol F type epoxy resins, bisphenol fluorene type epoxy resins, and biscresol fluorene type epoxy resins; novolac type epoxy resins such as phenol novolac type epoxy resins and cresol novolac type epoxy resins; glycidyl ethers of polyhydric alcohols such as oxazolidone-modified epoxy resins, glycidyl ethers of phenols such as brominated epoxy resins of these resins, dipropylene glycol diglycidyl ether, trimethylolpropane triglycidyl ether, diglycidyl ethers of alkylene oxide adducts of bisphenol A, and diglycidyl ethers of hydrogenated bisphenol A; alicyclic epoxy resins such as 3,4-epoxy-6-methylcyclohexylmethyl-3,4-epoxy-6-methyl-cyclo hexanecarboxylate and 1-epoxyethyl-3,4-epoxycyclohexane; glycidyl esters such as phthalic acid diglycidyl ester, tetrahydrophthalic acid diglycidyl ester, diglycidyl-p-oxybenzoic acid, dimer acid glycidyl ester; glycidylamines such as tetraglycidyldiaminodiphenylmethane, tetraglycidyl-m-xylenediamine, triglycidyl-p-aminophenol, and N,N-diglycidylaniline; and heterocyclic epoxy resins such as 1,3-diglycidyl-5,5-dimethylhydantoin and triglycidyl isocyanurate. Among them, a bifunctional aromatic epoxy resin is preferable, and a bisphenol A type epoxy resin and a bisphenol F type epoxy resin are more preferable, because they are excellent in the strength of a molded article, the handling property of a molding material, and the fluidity of a molding material during molding. These epoxy resins may be used alone or in combination of two or more kinds thereof. When the epoxy resins are used in combination of two or more kinds thereof, the epoxy equivalent of the epoxy resins (a1) is the average epoxy equivalent of all epoxy resins.

In addition, in order to adjust the epoxy equivalent, the molecular weight of the epoxy resin (a1) may be increased by a dibasic acid such as bisphenol A and then used.

The reaction between the epoxy resin and the (meth) acrylic acid described above is preferably carried out at 60 to 140° C. using an esterification catalyst. In addition, it is also possible to use a polymerization inhibitor or the like.

It is important that the unsaturated monomer (B) has a flash point of 100° C. or higher. This makes it possible to suppress the odor during the molding operation, and to improve the working environment. In addition, since the boiling point of the unsaturated monomer is high, molding property during high-temperature molding is excellent, high-temperature short-time molding is possible, and productivity is improved.

The flash point in the present invention is a flash point measured by the Cleveland open-cup method defined in JIS K2265-4:2007.

Examples of the unsaturated monomer (B) include monofunctional (meth)acrylate compounds such as benzyl (meth) acrylate, phenoxyethyl (meth)acrylate, phenoxypolyethylene glycol (meth)acrylate, polyethylene glycol (meth) acrylate alkyl ether, polypropylene glycol (meth)acrylate alkyl ether, 2-ethylhexyl methacrylate, isodecyl (meth)acrylate, lauryl (meth)acrylate, isotridecyl (meth)acrylate, n-stearyl (meth)acrylate, tetrahydrofurfuryl methacrylate, isobornyl (meth)acrylate, dicyclopentenyloxyethyl (meth) acrylate, and dicyclopentanyl methacrylate; di(meth)acrylate compounds such as ethylene glycol di(meth)acrylate, propylene glycol di(meth)acrylate, 1,4-butanediol di(meth) acrylate, 1,3-butanediol di(meth)acrylate, neopentyl glycol di(meth)acrylate, 1,6-hexanediol di(meth)acrylate, bisphenol di(meth)acrylate, and 1,4-cyclohexanedimethanol di(meth)acrylate; diallyl phthalate, and divinylbenzene. Among them, aromatic unsaturated monomers are preferable, and benzyl methacrylate and phenoxyethyl methacrylate are more preferable, because a molding material having higher strength can be obtained. These unsaturated monomers may be used alone or in combination of two or more kinds thereof.

The mass ratio ((A)/(B)) of the vinyl ester (A) to the unsaturated monomer (B) is in the range of 40/60 to 85/15, and is preferably in the range of 50/50 to 70/30 because the balance between the resin impregnation property into the carbon fiber, the handling property (tackiness), and the curing property is further improved.

In addition, the viscosity of the mixture of the vinyl ester (A) and the unsaturated monomer (B) is preferably in the range of 200 to 8000 mPa·s (25° C.) because the resin impregnating property into the carbon fiber is further improved.

Examples of the thermoplastic resin (C) include polyamide resins, polyethylene terephthalate resins, polybutylene terephthalate resins, polycarbonate resins, urethane resins, polypropylene resins, polyethylene resins, polystyrene resins, acrylic resins, polybutadiene resins, polyisoprene resins, and copolymers such as styrene-divinylbenzene copolymers and styrene-butadiene copolymers. These thermoplastic resins may be used alone or in combination of two or more kinds thereof.

In addition, as the thermoplastic resin (C), it is preferable to use a powdery thermoplastic resin because the warpage deformation of the obtained molded article can be further reduced, and a solubility in the unsaturated monomer (B) at 23° C. is more preferably 1 g/100 g or less, and still more preferably 0.1 g/100 g or less.

The content of the thermoplastic resin (C) is preferably in the range of 1 to 50% by mass, more preferably in the range of 5 to 40% by mass, and still more preferably in the range of 10 to 30% by mass, with respect to the total amount of the vinyl ester (A) and the unsaturated monomer (B), because the warpage deformation is small and a high-strength molded article is obtained.

Examples of the polyisocyanate (D) which can be used include aromatic polyisocyanates such as diphenylmethane diisocyanate (4,4'-form, 2,4'-form, or 2,2'-form, or a mixture thereof), modified product of diphenylmethane diisocyanate including carbodiimide modified product, nurate modified product, biurette modified product, or urethane imine modified product of diphenylmethane diisocyanate, and polyol modified product which is modified from polyol with number average molecular weight of 1,000 or less such as diethylene glycol and dipropylene glycol, tolylene diisocyanate, tolidine diisocyanate, polymethylene polyphenyl polyisocyanate, xylylene diisocyanate, 1,5-naphthalene diisocyanate, and tetramethylxylene diisocyanate; alicyclic polyisocynates such as isophorone diisocyanate, hydrogenated diphenylmethane diisocyanate, hydrogenated xylylene diisocyanate, and norbornene diisocyanate; and aliphatic polyisocyanates such as hexamethylene diisocyanate, nurate modified product, biurette modified product, or adduct of hexamethylene diisocyanate, and dimeric acid diisocyanate. Among these, aromatic polyisocyanates are preferable, and carbodiimide modified products of diphenylmethane diisocyanate are more preferable, since molding materials excellent in handling property (film peelability and tackiness) can be obtained. Examples of the carbodiimide modified product of diphenylmethane diisocyanate include products having a urethane imine structure formed by adding an isocyanate group to a carbodiimide group, in addition to products having a carbodiimide group. These polyisocyanates (D) may be used alone or in combination of two or more kinds thereof.

The molar ratio (NCO/OH) of the isocyanate group (NCO) of the polyisocyanate (D) to the hydroxy group (OH) of the vinyl ester (A) is 0.25 to 0.85, and is preferably 0.5 to 0.8 because the balance between the handling property (film peelability and tackiness) due to the increase in molecular weight and the resin fluidity during molding is more excellent.

The polymerization initiator (E) is not particularly limited, but is preferably an organic peroxide, and examples thereof include a diacyl peroxide compound, a peroxyester compound, a hydroperoxide compound, a ketone peroxide compound, an alkyl perester compound, a percarbonate compound, and a peroxyketal, and can be appropriately selected depending on the molding conditions. These polymerization initiators (E) may be used alone or in combination of two or more kinds thereof.

Among these, a polymerization initiator having a temperature of 70° C. or higher and 110° C. or lower for obtaining a 10-hour half-life is preferably used for the purpose of shortening the molding time. When the temperature is 70° C. or higher and 110° C. or lower, the life of the fiber-reinforced molding material at normal temperature is long, and the fiber-reinforced molding material can be cured in a short time by heating, which is preferable, and the balance between the curing property and the molding property is more excellent. Examples of such a polymerization initiator include 1,6-bis(t-butylperoxycarbonyloxy)hexane, 1,1-bis(t-butylperoxy)cyclohexane, 1,1-bis(t-amylperoxy) cyclohexane, 1,1-bis(t-hexylperoxy)cyclohexane, t-butylperoxydiethyl acetate, t-butylperoxyisopropyl carbonate, t-amylperoxyisopropyl carbonate, t-hexylperoxyisopropyl carbonate, di-tert-butylperoxyhexahydroterephthalate, and t-amylperoxytrimethylhexanoate.

The content of the polymerization initiator (E) is preferably in the range of 0.3 to 3% by mass with respect to the total amount of the vinyl ester (A) and the unsaturated monomer (B) because both curing characteristics and storage stability are excellent.

As the carbon fibers (F), carbon fibers cut into lengths of 2.5 to 50 mm are used, and carbon fibers cut into lengths of 5 to 40 mm are more preferable because the fluidity in the mold during molding, the appearance of the molded article, and the mechanical properties are further improved.

As the carbon fibers (F), various types of carbon fibers such as polyacrylonitrile-based carbon fibers, pitch-based carbon fibers, and rayon-based carbon fibers can be used. Among these, polyacrylonitrile-based carbon fibers are preferable because high-strength carbon fibers can be easily obtained.

The number of filaments of the fiber bundle used as the carbon fibers (F) is preferably 1000 to 60000 from the viewpoint of further improving the resin impregnation property and the mechanical properties of the molded article.

The content of the carbon fibers (F) in the components of the fiber-reinforced molding material of the present invention is preferably in the range of 25 to 80% by mass, more preferably in the range of 40 to 70% by mass, from the viewpoint of further improving the mechanical properties of the obtained molded article. When the carbon fiber content is low, there is a possibility that a high-strength molded article cannot be obtained, and when the carbon fiber content is high, there is a possibility that the resin impregnation property into the fiber is insufficient, the molded article swells, and a high-strength molded article cannot be obtained.

The carbon fibers (F) in the fiber-reinforced molding material of the present invention are impregnated with the resin in a state in which the fiber direction is random.

The fiber-reinforced molding material of the present invention may contain components other than the vinyl ester (A), the unsaturated monomer (B), the thermoplastic resin (C), the polyisocyanate (D), the polymerization initiator (E), and the carbon fibers (F). For example, a thermosetting resin other than the vinyl ester (A), a thermoplastic resin, a polymerization inhibitor, a curing accelerator, a filler, a shrinkage reducing agent, a release agent, a viscosity improver, a viscosity reducing agent, a pigment, an antioxidant, a plasticizer, a flame retardant, an antibacterial agent, an ultraviolet stabilizer, a reinforcing material, a photo-curing agent, and the like may be contained.

Examples of the thermosetting resin include a vinyl urethane resin, an unsaturated polyester resin, an acrylic resin, an epoxy resin, a phenol resin, a melamine resin, and a furan resin. These thermosetting resins may be used alone or in combination of two or more kinds thereof.

Examples of the thermoplastic resin include a polyamide resin, a polyethylene terephthalate resin, a polybutylene terephthalate resin, a polycarbonate resin, a urethane resin, a polypropylene resin, a polyethylene resin, a polystyrene resin, an acrylic resin, a polybutadiene resin, a polyisoprene resin, and resins obtained by modifying these resins by copolymerization or the like. These thermoplastic resins may be used alone or in combination of two or more kinds thereof.

Examples of the polymerization inhibitor include hydroquinone, trimethylhydroquinone, p-t-butylcatechol, t-butylhydroquinone, toluhydroquinone, p-benzoquinone, naphthoquinone, hydroquinone monomethyl ether, phenothiazine, copper naphthenate, and copper chloride. These polymerization inhibitors may be used alone or in combination of two or more kinds thereof.

Examples of the curing accelerator include metal soaps such as cobalt naphthenate, cobalt octenoate, vanadyl octenoate, copper naphthenate, and barium naphthenate; and metal chelate compounds such as vanadyl acetylacetate, cobalt acetylacetate, and iron acetylacetonate. Examples of the amines include N,N-dimethylamino-p-benzaldehyde, N,N-dimethylaniline, N,N-diethylaniline, N,N-dimethyl-p-toluidine, N-ethyl-m-toluidine, triethanolamine, m-toluidine, diethylenetriamine, pyridine, phenylmorpholine, piperidine, and diethanolaniline. These curing accelerators may be used alone or in combination of two or more kinds thereof.

Examples of the filler include inorganic compounds and organic compounds, which can be used for adjusting physical properties such as strength, elastic modulus, impact strength, and fatigue durability of the molded article.

Examples of the inorganic compound include calcium carbonate, magnesium carbonate, barium sulfate, mica, talc, kaolin, clay, celite, asbestos, barite, baryta, silica, silica sand, dolomite limestone, gypsum, aluminum fine powder, hollow balloons, alumina, glass powder, aluminum hydroxide, white marble, zirconium oxide, antimony trioxide, titanium oxide, molybdenum dioxide, and iron powder.

Examples of the organic compound include natural polysaccharide powder such as cellulose and chitin, and synthetic resin powder. Examples of the synthetic resin powder include organic powder composed of hard resin, soft rubber, elastomer, or polymer (copolymer) or the like, and particles having a multilayer structure such as a core-shell structure. Specific examples thereof include particles made of butadiene rubber and/or acrylic rubber, urethane rubber, silicon rubber, and the like, polyimide resin powder, fluororesin powder, and phenol resin powder. These fillers may be used alone or in combination of two or more kinds thereof.

Examples of the release agent include zinc stearate, calcium stearate, paraffin wax, polyethylene wax, and carnauba wax. Preferred examples thereof include paraffin wax, polyethylene wax, and carnauba wax. These release agents may be used alone or in combination of two or more kinds thereof.

Examples of the viscosity improver include metal oxides and metal hydroxides such as magnesium oxide, magnesium hydroxide, calcium oxide, and calcium hydroxide, and acrylic resin-based fine particles, which can be appropriately selected depending on the handling property of the fiber-reinforced molding material of the present invention. These viscosity improvers may be used alone or in combination of two or more kinds thereof.

The fiber-reinforced molding material of the present invention is preferably a sheet molding compound (hereinafter, abbreviated as "SMC") or a bulk molding compound (hereinafter, abbreviated as "BMC") from the viewpoint of excellent productivity and molding property having design diversity.

Examples of the method for producing the SMC include a method in which the components such as the vinyl ester (A), the unsaturated monomer (B), the thermoplastic resin (C), the polyisocyanate (D), and the polymerization initiator (E) are mixed and dispersed using a mixer such as an ordinary mixer, an intermixer, a planetary mixer, a roll, a kneader, or an extruder, the obtained resin composition is applied to carrier films placed above and below so as to have a uniform thickness, the carbon fibers (F) are sandwiched between the resin compositions on the carrier films placed above and below, and then the whole is passed between impregnation rolls to impregnate the carbon fibers (F) with the resin compositions by applying pressure, and then the whole is wound into a roll shape or folded in a zigzag manner. Further, it is preferable to perform aging at a temperature of 25 to 60° C. thereafter. As the carrier film, a polyethylene film, a polypropylene film, a laminate film of polyethylene and polypropylene, polyethylene terephthalate, nylon or the like may be used.

Examples of the method for producing the BMC include a method in which the components such as the vinyl ester (A), the unsaturated monomer (B), the thermoplastic resin (C), the polyisocyanate (D), and the polymerization initiator (E) are mixed and dispersed using a mixer such as an ordinary mixer, an intermixer, a planetary mixer, a roll, a kneader, or an extruder, and the carbon fibers (F) are mixed and dispersed in the obtained resin composition, as in the method for producing the SMC. In addition, similarly to the SMC, aging is preferably performed at a temperature of 25 to 60° C.

The molded article of the present invention is obtained from the fiber-reinforced molding material, and from the viewpoints of excellent productivity and excellent design diversity, the molding method is preferably heat compression molding of SMC or BMC.

In the heat compression molding, for example, a predetermined amount of a molding material such as SMC or BMC is weighed, placed in a mold heated to 110 to 180° C. in advance, clamped by a compression molding machine to shape the molding material, the molding material is cured by maintaining a molding pressure of 0.1 to 30 MPa, and then the molded article is taken out to obtain a molded article. As a specific molding condition, a molding condition in which a molding pressure of 1 to 10 MPa is maintained at a mold temperature of 120 to 160° C. in the mold for 1 to 2 minutes per the thickness 1 mm of the molded article is preferable, and a molding condition in which a molding pressure of 1 to 10 MPa is maintained at a mold temperature of 140 to 160° C. for 30 to 90 seconds per the thickness 1 mm of the molded article is more preferable because productivity is further improved.

Since the molded article obtained from the fiber-reinforced molding material of the present invention is excellent in dimensional accuracy, bending strength and the like, and emission of volatile organic compounds is suppressed, the molded article can be suitably used in automotive members, railroad vehicle members, airspace craft members, ship members, house facility members, sports members, lightweight vehicle members, construction and civil engineering members, case bodies for OA instrument, and the like.

EXAMPLES

Hereinafter, the present invention will be described in more detail with reference to specific examples. The hydroxyl value was determined by measuring the number of milligrams of potassium hydroxide (mgKOH/g) required to neutralize acetic acid generated when the resin sample 1 g was reacted at a specified temperature for a specified time using an acetylating agent based on a prescribed method in accordance with JIS K-0070. In addition, the epoxy equivalent was calculated using a prescribed calculation formula, based on a prescribed method in accordance with JIS K-7236, by dropping perchloric acid to a resin sample in the co-presence of the sample and an ammonium bromide salt, and setting a point at which the generated hydrogen bromide became excessive by consuming all epoxy groups as an end point.

Synthesis Example 1

Synthesis of Vinyl Ester (A-1)

In a 2 L flask equipped with a thermometer, a nitrogen inlet tube, and a stirrer, 667 parts by mass of an epoxy resin ("EPICLON 850" manufactured by DIC Corporation, bisphenol A type epoxy resin, epoxy equivalent of 188), 96.9 parts by mass of bisphenol A, and 0.38 parts by mass of 2-methylimidazole were charged, and the temperature was raised to 120° C. and the reaction was allowed to proceed for 3 hours to measure the epoxy equivalent. After confirming that the epoxy equivalent reached 283 as set, the mixture was cooled to around 60° C., 228 parts by mass of methacrylic acid and 0.29 parts by mass of t-butylhydroquinone were charged, and the mixture was heated to 90° C. under a gas flow of a mixture of nitrogen and air at a ratio of 1:1. Then, 0.23 parts by mass of 2-methylimidazole was added thereto, and the mixture was heated to 110° C. and reacted for 10 hours. As a result, the acid value became 6 or less, and the reaction was terminated. After cooling to around 60° C., the mixture was taken out of the reaction vessel to obtain a vinyl ester (A-1) having a hydroxyl value of 204 mgKOH/g.

Example 1

Preparation of Fiber-Reinforced Molding Material (1)

After 20 parts by mass of polyethylene fine powder ("FLO-THENE UF-20S" manufactured by Sumitomo Seika Chemicals Co., Ltd., solubility in phenoxyethyl methacrylate at 23° C.: 0.1 g/100 g or less) was dispersed in 100 parts by mass of a resin solution which was prepared by dissolving 55 parts by mass of the vinyl ester (A-1) obtained in Synthesis Example 1 in 45 parts by mass of phenoxyethyl methacrylate, 21 parts by mass of a polyisocyanate ("Cosmonate LL" manufactured by Mitsui Chemicals, Inc., hereinafter abbreviated as "polyisocyanate (D-1)") and 1 part by mass of a polymerization initiator ("Kayacarbon AIC-75" manufactured by Kayaku Akzo Co., Ltd., organic peroxide, hereinafter abbreviated as "polymerization initiator (E-1)") were mixed to obtain a resin composition (X-1). The molar ratio (NCO/OH) in the resin composition (X-1) was 0.74.

The resin composition (X-1) obtained above was coated on a laminate film of polyethylene and polypropylene in an average coating amount of 1 kg/m², and carbon fibers obtained by cutting a carbon fiber roving ("T700SC-12000-50C" manufactured by Toray Industries, Inc.) into 12.5 mm (hereinafter abbreviated as carbon fibers (F-1)) were uniformly dropped thereon from the air so as to have no fiber orientation, a uniform thickness, and a carbon fiber content of 47% by mass. Similarly, the carbon fibers were sandwiched between films coated with the resin composition (X-1) to impregnate the carbon fibers with the resin, and then left to stand in a thermostat at 45° C. for 24 hours to obtain a sheet-shaped fiber-reinforced molding material (1). The basis weight of the sheet-shaped fiber-reinforced molding material (1) was 2 kg/m².

Example 2

Preparation of Fiber-Reinforced Molding Material (2)

A resin composition (X-2) and a fiber-reinforced molding material (2) were obtained in the same manner as in Example 1, except that 20 parts by mass of the polyethylene fine powder used in Example 1 was changed to 20 parts by mass of a styrene-divinylbenzene copolymer ("SGP-70C" manufactured by Soken Chemical & Engineering Co., Ltd., solubility in phenoxyethyl methacrylate at 23° C.: 0.1 g/100 g or less). The molar ratio (NCO/OH) in the resin composition (X-2) was 0.74, and the basis weight of the fiber-reinforced molding material (2) was 2 kg/m².

Comparative Example 1

Preparation of Fiber-Reinforced Molding Material (R1)

A resin composition (RX-1) and a fiber-reinforced molding material (R1) were obtained in the same manner as in Example 1, except that the polyethylene fine powder used in Example 1 was not used. The molar ratio (NCO/OH) in the resin composition (RX-1) was 0.74, and the basis weight of the fiber-reinforced molding material (R1) was 2 kg/m².

Comparative Example 2

Preparation and Evaluation of Fiber-Reinforced Molding Material (R2)

A resin composition (RX-2) and a fiber-reinforced molding material (R2) were obtained in the same manner as in Example 1, except that 45 parts by mass of phenoxyethyl methacrylate used in Example 1 was changed to 45 parts by mass of styrene and the polyethylene fine powder was not used. The molar ratio (NCO/OH) in the resin composition (RX-2) was 0.37, and the basis weight of the fiber-reinforced molding material (R1) was 2 kg/m².

Production of Molded Article

The sheet-shaped fiber-reinforced molding material obtained above was subjected to pressure molding under molding conditions of a mold temperature of 140° C., a pressing time of 3 minutes, and a pressing force of 10 MPa at a charge ratio of 50% with respect to the projected area of the 30-cm square mold to obtain a flat molded article having a plate thickness of 2 mm.

Evaluation of Dimensional Accuracy (Amount of Warpage Deformation)

The molded article obtained above was allowed to stand for 24 hours without being corrected, one point of the end portion of the molded article was fixed, the maximum height of the other end portion that was warped upward was measured, and the dimensional accuracy (amount of warpage deformation) was evaluated according to the following evaluation criteria.

Good: Amount of warpage deformation is less than 2 mm
NG: Amount of warpage deformation is 2 mm or more
The evaluation results of the fiber-reinforced molding materials (1), (2), (R1), and (R2) obtained above are shown in Table 1.

TABLE 1

| | | Example 1 | Example 2 | Comparative Example 1 | Comparative Example 2 |
|---|---|---|---|---|---|
| Fiber-reinforced molding material | | (1) | (2) | (R1) | (R2) |
| Vinyl ester (Epoxy equivalent of epoxy resin) | (A-1) (283) | 55 | 55 | 55 | 55 |
| Unsaturated monomer (flash point) | Phenoxyethyl methacrylate (120° C.) | 45 | 45 | 45 | |
| | Styrene (31° C.) | | | | 45 |

TABLE 1-continued

|  |  | Example 1 | Example 2 | Comparative Example 1 | Comparative Example 2 |
|---|---|---|---|---|---|
| Thermoplastic resin | Polyethylene fine powder | 20.0 | | | |
|  | Styrene-divinylbenzene copolymer | | 20.0 | | |
| Polyisocyanate | (D-1) | 21 | 21 | 21 | 10.5 |
| Molar ratio (NCO/OH) | | 0.74 | 0.74 | 0.74 | 0.37 |
| Polymerization initiator | (E-1) | 1 | 1 | 1 | 1 |
| Carbon fibers | (F-1) | 126 | 126 | 108 | 99 |
| Dimensional accuracy | | Good | Good | NG | NG |
| Amount of warpage deformation (mm) | | 0.9 | 1.6 | 2.4 | 8.2 |

It was found that the molded articles obtained from the fiber-reinforced molding materials of Examples 1 and 2 of the present invention had a small amount of warpage deformation and excellent dimensional accuracy.

On the other hand, Comparative Examples 1 and 2 are examples not containing the thermoplastic resin which is an essential component of the present invention, and it was found that the amount of warpage deformation was large and the dimensional accuracy was poor.

The invention claimed is:

1. A fiber-reinforced molding material comprising: as essential raw materials, a vinyl ester (A) which is a reaction product of an epoxy resin (a1) having an epoxy equivalent in the range of 180 to 500 and a (meth)acrylic acid (a2); an unsaturated monomer (B) having a flash point of 100° C. or higher; a thermoplastic resin (C); a polyisocyanate (D); a polymerization initiator (E); and carbon fibers (F) having a fiber length of 2.5 to 50 mm, wherein a solubility of the thermoplastic resin (C) in the unsaturated monomer (B) at 23° C. is 1 g/100 g or less, a mass ratio ((A)/(B)) of the vinyl ester (A) to the unsaturated monomer (B) is in a range of 40/60 to 85/15, and a molar ratio (NCO/OH) of the isocyanate group (NCO) of the polyisocyanate (D) to the hydroxy group (OH) of the vinyl ester (A) is in a range of 0.25 to 0.85.

2. The fiber-reinforced molding material according to claim 1, wherein the unsaturated monomer (B) is phenoxyethyl methacrylate and/or benzyl methacrylate.

3. The fiber-reinforced molding material according to claim 2, wherein a molar ratio (COOH/EP) of the epoxy group (EP) of the epoxy resin (a1) to the carboxyl group (COOH) of the (meth)acrylic acid (a2) is in a range of 0.6 to 1.1.

4. The fiber-reinforced molding material according to claim 1, wherein a molar ratio (COOH/EP) of the epoxy group (EP) of the epoxy resin (a1) to the carboxyl group (COOH) of the (meth)acrylic acid (a2) is in a range of 0.6 to 1.1.

5. The fiber-reinforced molding material according to claim 1, wherein the polyisocyanate (D) is an aromatic polyisocyanate.

6. A molded article comprising the fiber-reinforced molding material according to claim 1.

7. The fiber-reinforced molding material according to claim 1, wherein a content of the thermoplastic resin (C) is in a range of 1 to 50% by mass with respect to a total amount of the vinyl ester (A) and the unsaturated monomer (B).

8. The fiber-reinforced molding material according to claim 1, wherein a content of the thermoplastic resin (C) is in a range of 5 to 40% by mass with respect to a total amount of the vinyl ester (A) and the unsaturated monomer (B).

9. The fiber-reinforced molding material according to claim 1, wherein a content of the thermoplastic resin (C) is in a range of 10 to 30% by mass with respect to a total amount of the vinyl ester (A) and the unsaturated monomer (B).

10. The fiber-reinforced molding material according to claim 1, wherein the thermoplastic resin (C) includes polyethylene.

11. The fiber-reinforced molding material according to claim 1, wherein the thermoplastic resin (C) includes styrene-divinylbenzene copolymer.

* * * * *